Sept. 14, 1926.

G. R. CRAZE 1,599,460

ADVERTISING SYSTEM

Filed April 18, 1925      2 Sheets-Sheet 1

Fig. 1.

NAME OF PERIODICAL

CROSS ADD PUZZLER.
SYSTEM OF ADVERTISING.
YOU WILL NOTICE OPPOSITE SEVERAL OF THE KEY
PHRASES A LETTER "P" FOLLOWED BY A NUMBER
IN SOME CASES THE LETTER "A" FOLLOWED
BY A NUMBER.
THE LETTER "P" AND NUMBER DENOTES A
GIVEN PAGE IN THIS PERIODICAL.
TURN TO THAT PAGE. YOU WILL SEE ONE
OR MORE ADVERTISEMENTS. IN THIS ADVER-
TISEMENT OR ADVERTISEMENTS THE
DESIRED WORD IS USED.
THE LETTER "A" AND NUMBER DENOTES
A CERTAIN ADVERTISEMENT WHICH IS
ALSO NUMBERED.

HORIZONTAL
1 PILGRIM TO THE HOLY LAND.
6 HALF-BREED
11 HURRY (P-4)
12 PERSUING
15 SPACE OF TIME
16 HAR
17 STRIPS OF DRY
   DOUGH. (P-1) (A-1)
18 TO STEEP IN WATER
19 RESTED
20 DRESSED UP (P-2) (A-6)
21 A TREE (P-1) (A-2
22 PRONOUN
24 STRENGTHENED BY
   INNER WORKS (P-1) (A-5

VERTICAL
1 A LIGHT HOUSE
2 AN OFFICER
3 TANNED HIDES (P-4) (A-2)
4 AGE
5 PERTAINING TO THE KIDNEYS
6 A RIBBON
7 EXCITED
8 DELAYED
9 METALS IN ORIGINAL FORM
10 WINDOW FRAMES (P-3) (A-3)
13 UPPER PART OF A HOUSE (P-3) (A-2)
14 TO BURY
23 SNAKELIKE FISH
25 SHORT SLUMBER
26 WINGED PART

PAGE-4

PROTECT YOUR EMPLOYEES
BY USING
OAKEN GRAIN LEATHER MOTOR BELTS.

OAKEN GRAIN BELT CO.
KANSAS CITY, MO.

Fig. 4.

PECO COAL CO.
PHILA. PA.

Inventor
Glenn R. Craze,
By Hubard & Hubard
his Attorneys

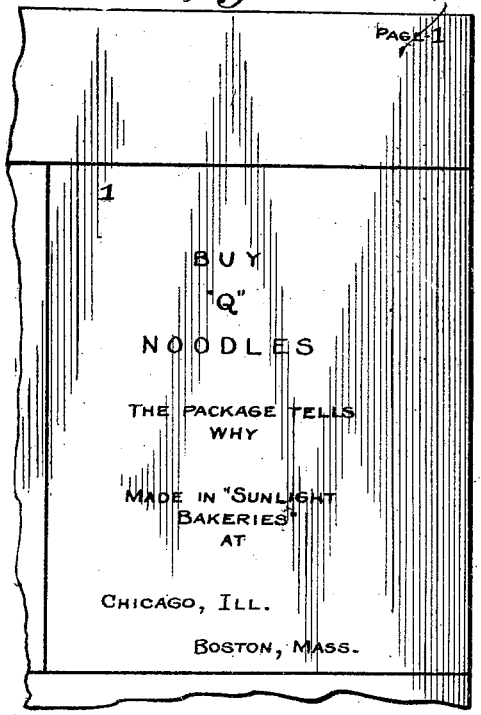
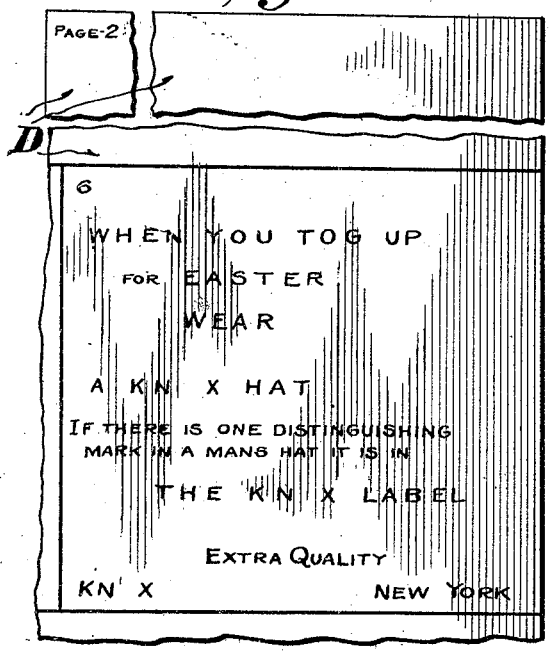
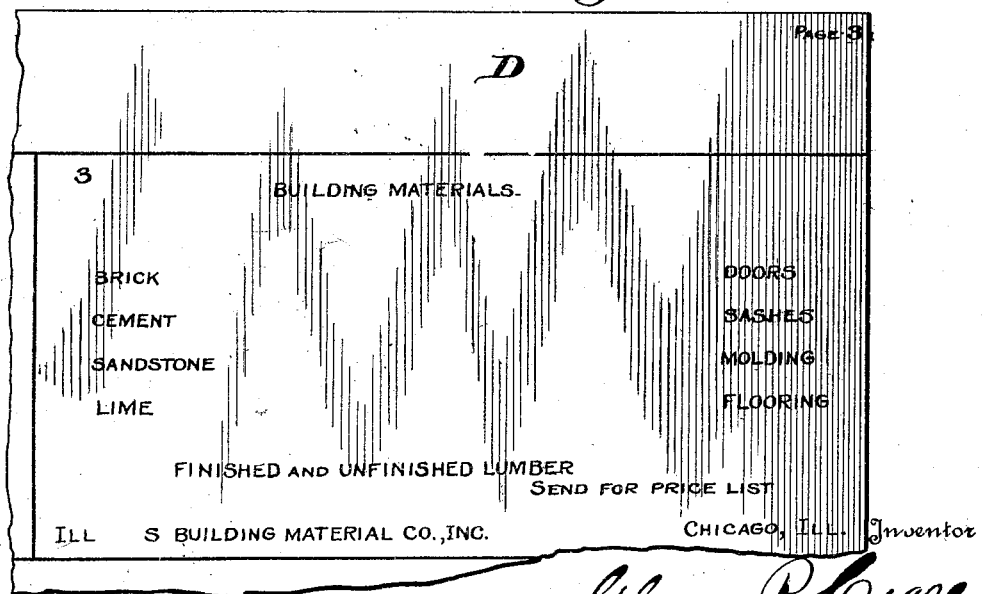

Patented Sept. 14, 1926.

1,599,460

UNITED STATES PATENT OFFICE.

GLENN R. CRAZE, OF MARQUETTE, MICHIGAN.

ADVERTISING SYSTEM.

Application filed April 18, 1925. Serial No. 24,183.

This invention is an advertising system, and has for its object to impel the reading of advertisements in magazines, newspapers and other printed periodicals and publications, thereby to increase the advertising value of the publication.

In carrying out the invention, use is made of the popular and so called "cross word puzzle" as a means for directing attention to advertisements contained in the publication as an aid to the solving of the puzzle and as a means of checking the correctness of the solution.

An embodiment of the invention has been shown in the accompanying drawings, wherein:—

Figure 1 is a fragmentary perspective view of a magazine embodying the features of the present invention, Figures 2, 3, 4 and 5 are fragmentary views of different pages of the magazine showing advertisements containing words to be entered on the diagram of the cross word puzzle.

In Figure 1 of the drawings there has been illustrated a magazine which has been designated generally by the reference character A, and of course includes a front cover B, a back cover C and leaves or pages D. However, it will of course be understood that the physical character of the periodical or publication forms no part of the present invention, as the periodical or publication may be of any kind whatsoever. The pages of the publication may contain news matters, fiction or any other matter, and of course also contain advertisements, one such advertisement being indicated at the lower right hand of Figure 1.

A cross word puzzle may appear upon any of the pages of the publication, and in the Figure 1 of the drawings it has been shown on the front cover B, and includes any common or preferred form of blocked off diagram E and a list of the definitions of the words to be entered on the diagram. Following the usual practice the list of definitions has been shown divided into a list F of the definitions for the horizontal words and a list G of the definitions of the vertically disposed words.

In carrying out the object of the present invention, i. e., to impel the reading of advertisements in connection with the solution of the puzzle, certain of the advertisements contain certain of the words to be entered on the diagram, and such advertisements are indicated on the list of definitions by key indicia. For instance, under the list of horizontal definitions and associated with definition 17, will be found key indicia designated H. The indicia part ($P^1$) refers to page 1 of the magazine and the indicia part ($A^1$) refers to the advertisement on page 1, which is designated by the numeral 1. Such advertisement has been shown in Figure 2 of the drawings, and by examining the advertisement there will be found the word "Noodles" corresponding to definition 17, "Strips of dry dough", and it will be found that the seven letter word "Noodles" will fit properly in the horizontal position designated 17 on the diagram. Similarly the key indicia ($P^3$) ($A^3$) associated with the vertical definition 10, refers to page 3, and advertisement 3 thereon, as illustrated in Figure 5 of the drawings, and an examination of this advertisement will disclose the six letter word "Sashes" which may be properly entered on the diagram E in the vertical column designated 10.

In connection with the cross word puzzle, there is an explanation designated J of the manner of using the key indicia, and it will of course be understood that the language employed in the explanation may be varied at will, and the position of the explanation with respect to the diagram may also be varied at will.

The cross word puzzle may of course be solved entirely without referring to the advertisements and then the solution may be checked by utilizing the key indicia to locate the correct words by reference to the advertisements indicated by the indicia. The puzzle of course may be solved by referring to the advertisements in the first instance.

As illustrated in Figure 1 only certain of the definitions have key indicia associated therewith, but it will be understood that each definition may have a key indicia associated therewith if desired.

In whatever manner the puzzle may be worked out, the person working on the puzzle will naturally be impelled to read quite a number of the advertisements contained in the publication either for the purpose of checking the solution or finding the correct word in the first instance. The necessary reference to the advertisements of course materially enhances the value of the advertising in the publication which includes the present invention, and therefore it will be understood that the object of the present invention is accomplished in a simple, entertaining and useful manner.

It will of course be understood that the character of the diagram of the cross word puzzle may be varied at will, and the arrangement and position of the definitions may be such as the available space dictates or in accordance with any desired arrangement.

Where the expression "printed publication" has been employed in the specification and in the claims, it is intended to cover not merely reproductions from type, but a production or reproduction in any manner as by typewriting, mimeographing, multigraphing, photo-lithographing, etc.

While the present drawings illustrate the invention as embodied in connection with a book or magazine, it will of course be understood that the cross word puzzle and the advertisements may all appear upon a single sheet and the spirit of the invention will be present.

What is claimed is:—

1. In an advertising system, a plurality of bound pages having advertisements on some of the pages, a cross word puzzle on one of the pages and including a diagram and a list of definitions of the words to be entered on the diagram, certain of the advertisements containing certain of the words to be entered on the diagram, and key indicia associated with certain of the definitions and indicating the advertisements containing the words corresponding to the respective definitions.

2. In an advertising system, a plurality of bound pages having advertisements on some of the pages, a cross word puzzle on one of the pages and including a diagram and a list of definitions of the words to be entered on the diagram, certain of the advertisements containing certain of the words to be entered on the diagram, key indicia associated with certain of the definitions and indicating the advertisements containing the words corresponding to the respective definitions, and an explanation of the manner of using the key indicia to locate the advertisements containing the words corresponding to the respective definitions.

3. In an advertising system, a plurality of bound pages having advertisements on some of the pages, a cross word puzzle on one of the pages and including a diagram and a list of definitions of the words to be entered on the diagram, certain of the advertisements containing certain of the words to be entered on the diagram, and key indicia associated with certain of the definitions and including the page numbers on which are the advertisements containing the words corresponding to the respective definitions.

4. In an advertising system, a plurality of bound pages having advertisements on some of the pages, a cross word puzzle on one of the pages and including a diagram and a list of definitions of the words to be entered on the diagram, certain of the advertisements containing certain of the words to be entered on the diagram, and key indicia associated with certain of the definitions and including the advertisement numbers and the page numbers on which are the advertisements containing the words corresponding to the respective definitions.

5. A printed publication containing a cross word puzzle including a diagram and a list of definitions of the words to be entered on the diagram, certain of the definitions having associated therewith key indicia indicating where the words corresponding to the respective definitions may be found in the publication.

6. A printed publication containing a cross word puzzle including a diagram, a list of definitions of the words to be entered on the diagram, certain of the definitions having associated therewith key indicia indicating where the words corresponding to the respective definitions may be found in the publication, and an explanation of the manner of using the key indicia to locate the words to be entered on the diagram.

GLENN R. CRAZE.